United States Patent [19]
Liu et al.

[11] Patent Number: 4,875,340
[45] Date of Patent: Oct. 24, 1989

[54] NON-CONTAMINATING FLOW VISUALIZATION SYSTEM

[75] Inventors: Benjamin Y. H. Liu, North Oaks; James W. Ramsey, Golden Valley, both of Minn.

[73] Assignee: Regents of the University of Minnesota, Minneapolis, Minn.

[21] Appl. No.: 246,354

[22] Filed: Sep. 19, 1988

Related U.S. Application Data

[63] Continuation-in-part of Ser. No. 8,871, Jan. 29, 1987, Pat. No. 4,771,608.

[51] Int. Cl.$^4$ ................................................. F17C 0/2
[52] U.S. Cl. ........................................ 62/50.2; 62/52.1
[58] Field of Search ...................... 62/50.2, 54.2, 52.1

[56] References Cited

U.S. PATENT DOCUMENTS 2,406,540  8/1946  Harrington ............................. 62/54

FOREIGN PATENT DOCUMENTS

| 625504 | 8/1927 | France | 62/50.2 |
| 2227896 | 11/1974 | France | 62/50.2 |
| 1039729 | 8/1966 | United Kingdom | 62/50.2 |

Primary Examiner—Henry A. Bennet
Attorney, Agent, or Firm—Kinney & Lange

[57] ABSTRACT

A flow visualization system usable for clean rooms to determine the flow conditions that exist during manufacture, includes a frame mounting a source of steam and a liquid cryogen container. Steam is passed over an interface with the cryogenic material providing a highly visible fog that is neutrally buoyant and non-contaminating. The liquid cryogen level in the container is controlled by a float valve system which controls flow from a liquid cryogen tank.

19 Claims, 5 Drawing Sheets

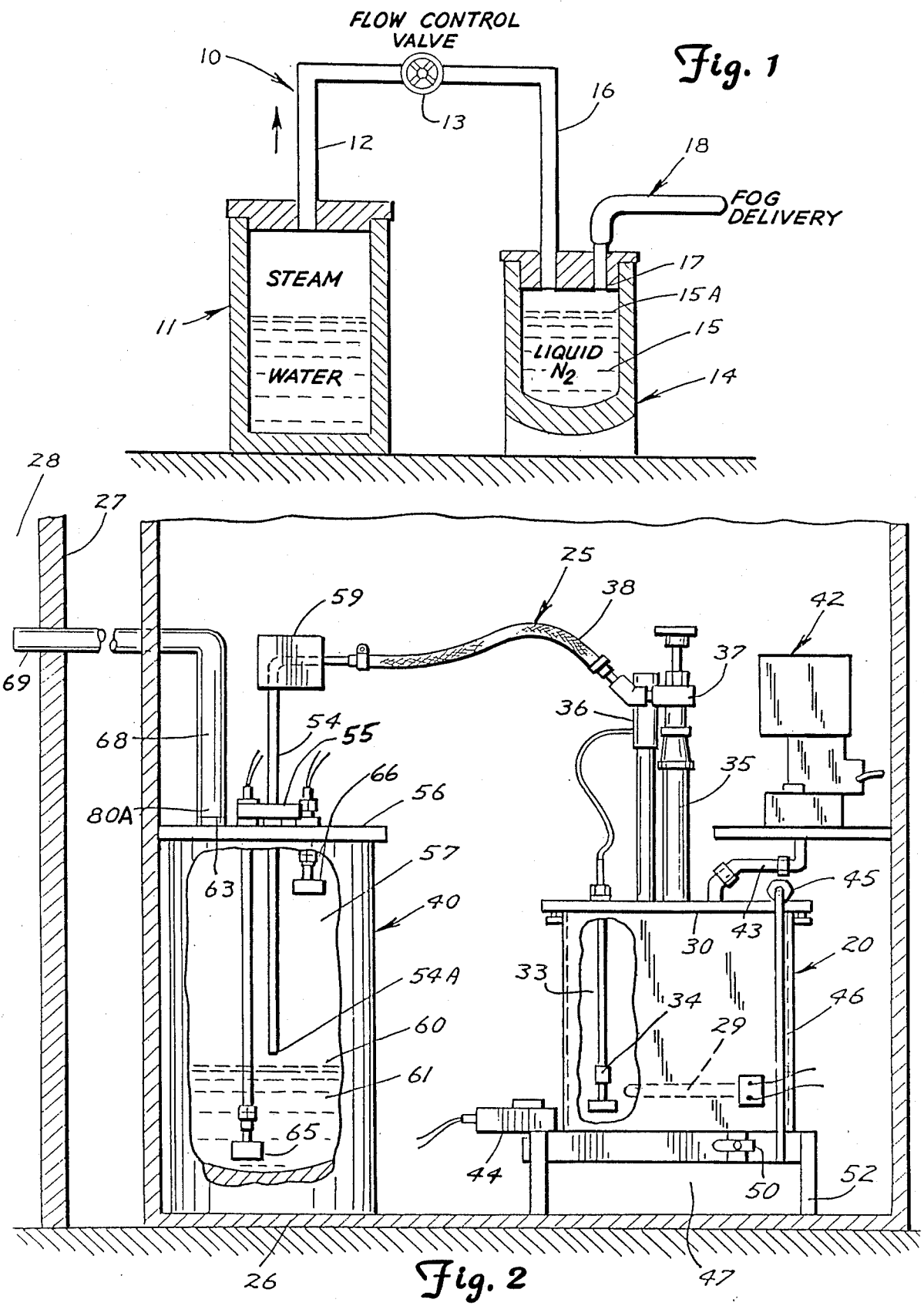

NON-CONTAMINATING FLOW VISUALIZATION SYSTEM

CROSS REFERENCE TO RELATED APPLICATION

This application is a continuation-in-part of copending Application Ser. No. 07/008,871, filed Jan. 29, 1987, now U.S. Pat. No. 4,771,608.

BACKGROUND OF THE INVENTION

1. Field of the Invention

The present invention relates to means for generating fog that does not contain any particulate contaminates.

2. Description of the Prior Art

Various flow visualization devices have been advanced for generating a fog, but the fogs produced leave residue when the water droplets forming the fog evaporate. When using a fog for determining the flow characteristics within a clean room, it is essential that the fog being used does not add contamination and leaves no residue upon evaporation. Thus the water droplets forming the fog have to be relatively pure and with no substantial size contaminated particles carried in them.

Present fog generators generally are not sufficiently clean or non-contaminating to be satisfactory for clean room use.

SUMMARY OF THE INVENTION

The present invention relates to a fog generator that is non-contaminating and can be used for analyzing air flows within a clean room. The generator comprises a unitary device frame mounted for producing steam that is water vapor, and passing it over an interface in a cryogenic material such as liquid nitrogen, to condense the water vapor in the steam to form a fog that is then delivered to the clean room through suitable nozzles. The flow can be controlled by the pressures in the boiler forming the steam supply, and suitable flow control valves in lines used. By appropriately passing the steam over liquid nitrogen the water vapor condenses quickly into fine water droplets that do not precipitate out, and provides a highly visible fog for determining flow patterns in rooms into which the fog is introduced.

The apparatus shown herein comprises an assembly of a pressure controlled boiling chamber, with an outlet that passes through a flow control valve and into a Dewar cryogen flask or container containing liquid nitrogen or some other suitable cryogen. The steam generated in the boiler flows across the surface of the liquid nitrogen producing a fog of very high droplet concentration. The fog then leaves the chamber containing the nitrogen through a delivery tube which terminates either with a single opening nozzle or a nozzle that has a plurality of openings.

The boiler, the Dewar flask in which the fog is generated and a separate Dewar supply tank of liquid nitrogen are supported as a unit. The supply of liquid nitrogen is controlled by a float level control in the fog generating container. Suitable interlock controls can be provided for safety.

The pressure needed to operate the system is provided entirely by the boiler chamber and flow is controlled by a manual flow control valve. There is no need for introduction of additional air or other carrier gases for moving the fog along its path. It is desirable to have the flow neutrally buoyant as well as non-contaminating, and the fog generated with the present device meets both criteria.

Suitable controls are provided for maintaining a uniform pressure and flow of steam, and float valve sensors can be provided for maintaining proper liquid level in the boiler. Excessive level of the cryogenic material, such as liquid nitrogen, is sensed with a temperature sensitive switch to cut off the main supply valve for the cryogen when the levels get too high.

Thus, the present invention provides a highly efficient fog producing apparatus that provides non-contaminating fog for visually determining flow characteristics.

A high density fog generator quenches the steam on the liquid nitrogen, to produce a highly visible, high purity fog of deionized water droplets, which leave no residue upon evaporation. The usage includes use in clean rooms for determining the airflow patterns around equipment, tools, and operators, as well as locating standing vortices. The unit can be used in manufacturing clean rooms for VLSI logic and memory chips, magnetic and optical disc drives, pharmaceuticals, research and development facilities and the like. It is extremely useful where understanding airflow patterns and controlling airborne contaminants are important factors.

BRIEF DESCRIPTION OF THE DRAWINGS

FIG. 1 is a schematic representation of a non-contaminating flow visualization system made according to a first form of the present inventions;

FIG. 2 is a side elevational view of a more detailed showing of the device of the first form of the present invention with parts shown schematically for illustrative purposes;

DETAILED DESCRIPTION OF THE PREFERRED EMBODIMENTS

Figure 3:
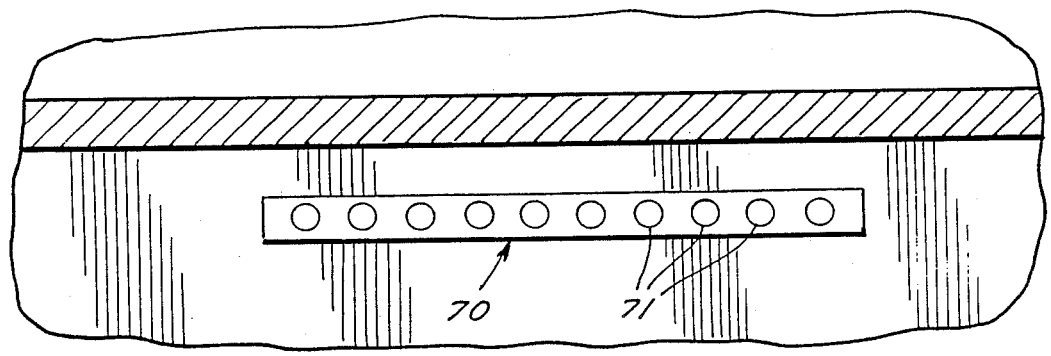
FIG. 3 is a view of a multiple outlet nozzle that can be used with the flow visualization system of the present invention.

Referring first to FIG. 1, a schematic representation of a first form of a non-contaminating flow visualization system is illustrated. In a simplified schematic form, the fog generating system indicated generally at 10 comprises a boiler 11 in which steam is generated, and the steam is passed through a line or tube 12 through a flow control valve 13 and into a Dewar cryogen flask or container 14 that is insulated for containing a cryogen such as liquid nitrogen indicated at 15 therein. The outlet side of the flow control valve is connected to a tube 16 that leads to the Dewar container and has its end terminating above the level indicated at 15A of the cryogen. As the steam passes across the surface of the cryogen it condenses out into dense water droplets forming a fog which, because of the pressure from the steam boiler, flows out through an exit orifice 17 and through a fog delivery tube and nozzle assembly indicated generally at 18.

In its simplified form, the essential elements for obtaining the desired fog characteristics are provided by having a boiler that permits water to be changed to steam, leaving dissolved impurity and suspended particulate contaminants behind in the steam boiler. Usually, high purity, deionized water is used in the boiler to further reduce the possibility of contaminants being introduced into the fog. The pressure in the boiler is sufficient so that the flow control valve 13 can regulate the amount of flow necessary for the needs of the visualization system. The distance of the steam discharge opening above the surface of the liquid nitrogen is important in determining the characteristics of the fog that is generated, namely, this spacing determines the temperature and density of the fog and can be controlled for obtaining the desired characteristics.

A more detailed form of the invention is shown in FIG. 2. The flow visualization system indicated generally at 25 is mounted in an outer housing or cabinet 26 in a suitable manner, and is positioned within a clean room 28 into which the fog will be discharged.

In this form of the invention, the cabinet 26 houses a boiler 20 which can be of any conventional design. It includes a heater element shown schematically at 29 on the interior, and has a upper cover 30 which encloses the boiler chamber indicated at 33. The heater element 29 is an electric heater element that has sufficient capacity to heat the water to cause steam to be formed and evaporate the water. The heater may be embedded into the bottom wall of the boiler, if desired. A conventional low water float switch 34 is used for controlling an inlet fill valve 36 to add water to the interior chamber 33 as the level falls below a desired amount.

The steam outlet pipe indicated at 35 is fastened to the cover 30 in a suitable manner, and the outlet pipe 35 has a flow control valve 37 therein which is connected to an outlet flange or tube 38 leading to the fog forming cryogenic container indicated generally at 40.

The heater 29 is controlled with a separate boiler pressure switch indicated generally at 42 that has a pressure sensing tube 43 leading to the interior chamber 33 of the boiler. The pressure switch 42 is a primary power control for the heater 29 to keep the heater operating to maintain the pressure in the boiler at a desired set level. A secondary safety temperature switch indicated at 44 is also provided for controlling power to the heater in series as will be seen from the schematic diagram. A safety relief valve 45 is provided and will open when boiler pressure exceeds the preset amount. A drain tube 46 is connected to the output side of the relief valve. The tube aligns with a waste water pan 47 that catches waste water from the relief valve. The waste water pan can be positioned below the boiler, and also can be used for catching drain water from a drain water valve 50 of the boiler. The boiler is supported on suitable legs 52 to provide a place for the waste water pan. This equipment is all inside the cabinet 26.

The outlet line or tube 38 from the flow control valve 37 connects to a steam tube 54 that passes through an adjustment clamping nut arrangement 55 and through a cover 56 of the Dewar flask and into the interior chamber 57 of the flask. An insulating (plastic) handle 59 is provided on the steam tube 54. The adjustment clamping nut arrangement 55 is large enough so that it aan be hand operated to loosen, and thus permit an operator to adjust the tube 54 up or down to bring the discharge end 54A of the tube 54 to the dsired level above the surface 60 of the liquid nitrogen 61.

The tube is moved manually, and proper adjustment can aid in changing the characteristics of the fog that is generated as the steam passes over the surface 60 and then, because of the internal boiler pressure, the fog is discharged from the Dewar flask through a discharge fitting 63.

A float switch indicated at 65 is used as shown for determining low level of nitrogen, and lights an indicator light and turns off the heater 29. Liquid nitrogen is introduced through the fog exit fitting 63. Additionally if desired, a high level switch 66 can be used for lighting a light indicator when the nitrogen reaches too high a level.

The outlet fitting 63 is connected to suitable tubing, indicated at 68, that generally will have a smooth interior surface to avoid collection of water droplets and the like. The tube 68 is coupled to a nozzle 69 that discharges into a clean room 28. The fog that is formed in Dewar flask 40 is highly concentrated and is visible to the naked eye, so that the flow characteristics within the room can be observed, and if desired recorded on video tape for later analysis.

The flow is carried by the boiler pressure which is maintained at a desired level. Boiler pressure is maintained with the pressure operated switch 42. A substantially constant pressure will be provided to the flow control valve 37. Adjusting the valve 37 achieves the desired flow rate of steam. The pressure actuated switch 42 is selected to have a very small deadband width and preferably can be adjusted to maintain pressure at between 2 and 12 inches of water. Such switches are commercially available. The delivery tube for the fog can be in the range of 1⅛ inch to 2½ inch I.D. hose of conventional design. Plastic hose is preferred. The insulating handle 59 permits moving the steam tube 54 up and down to achieve the desired density of the fog being formed without endangering the operator.

If desired, the discharge nozzle array shown in FIG. 3 can be used. A header tube 70 having a plurality of nozzles 71 can be positioned where desired inside the clean room that is to be checked out, and by selecting the nozzles and the flow rate into the header tube the desired amount of fog can be discharged.

Figure 4:
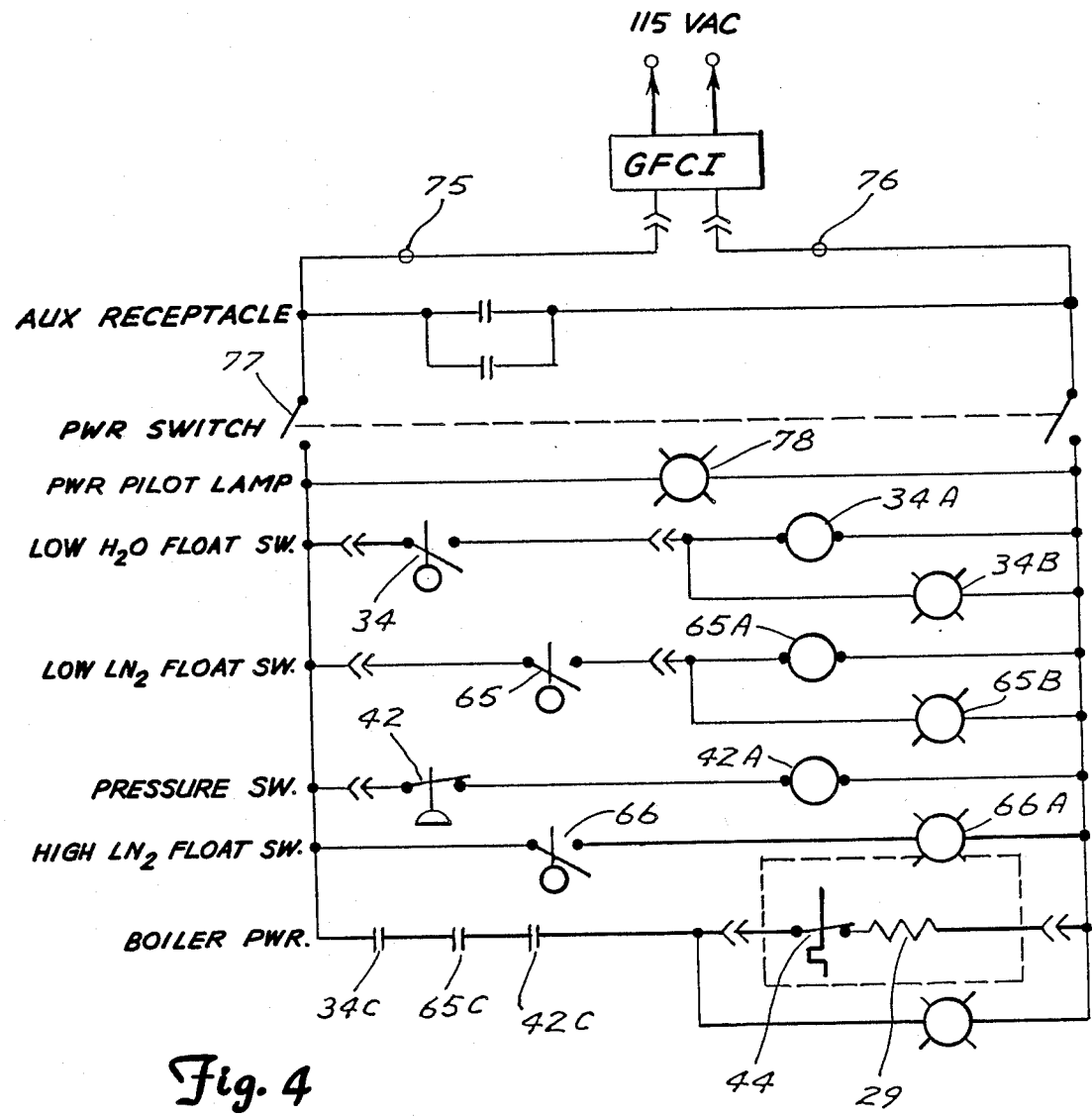
FIG. 4 is an electrical schematic representation of a circuit used for controlling the apparatus of FIG. 2.
Figure 5:
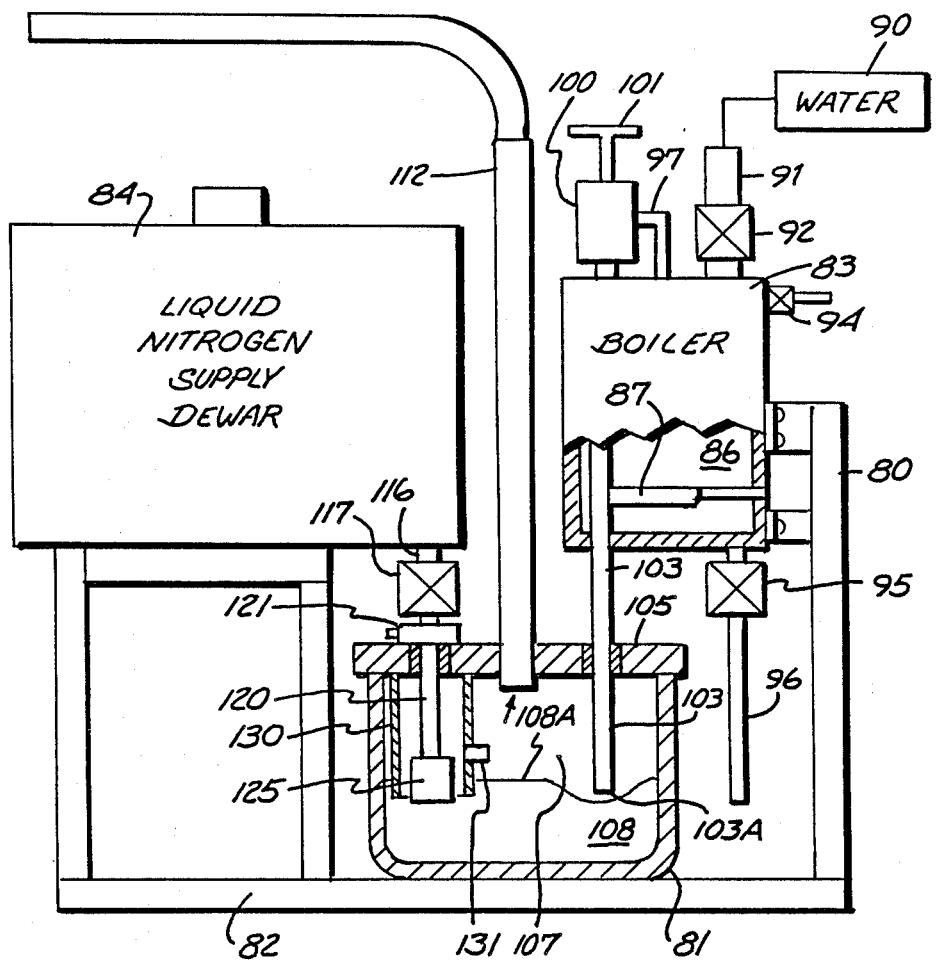
FIG. 5 is a schematic representation of a modified form of the invention showing a unitary assembly including a nitrogen supply.

A schematic control system is shown in FIG. 4. Power is supplied from a ground fault interrupter breaker along lines 75 and 76, respectively. The power switch indicated at 77 controls power to the rest of the system, and a pilot light 78 is provided across the lines.

The low water float switch 34 is connected to a relay 34A and an indicator light 34B. The light indicator lights when the level of water is low and the switch 34 is closed.

A low nitrogen float switch indicated at 65 is connected to a second relay 65A and a green indicator light 65B, which are energized and light respectively when the nitrogen is above the low level. The switch lights the light 65B to indicate that nitrogen should be added, and also opens the contacts energized by the relay coil 65A, which control power to heater 29.

The pressure switch 42 is connected across the lines, and is used for energizing a third relay 42A.

If desired, a high nitrogen float switch indicated at 66 can be provided to energize a red indicator light 66A, but not to control any other functions.

The heater 29 is connected across the power lines in series with the temperature switch 44, and also in series with relay contacts 34C, 65C, and 42C, which are coupled with respective relays 34A, 65A, and 42A. All three of these contacts or switches have to be closed, that is all three of the relays have to be energized, before the heater 29 will be powered. It can be seen that the temperature switch 44 is also connected in series to the heater and acts as a safety switch. As the pressure switch 42 cycles, the heater 29 will be turned on and off to maintain the pressure in the boiler at the desired level.

Thus by controlling the boiler pressure and the flow using flow control valve 37, the amount of steam passing across the nitrogen surface can be controlled. The float switches used are magnetically coupled switches, and also are commercially available.

If desired, suitable viewing ports can be provided in both the boiler and the nitrogen Dewar flask so that the levels can be determined visually and easily. An option, as shown in FIG. 2, comprises the use of a temperature sensor 80A mounted in the steam outlet fitting 63, or at some other suitable location to sense the temperature of the fog, and in this way to permit analyzing the fog so that it can be maintained neutrally bouyant by adjusting the height of the steam pipe 54 and the end 54A thereof relative to the surface of the cryogen liquid.

In the second form of the invention shown in FIGS. 5-8, essentially the same operating apparatus is illustrated, but it is arranged to be a more compact, unitary assembly, and includes a large supply tank of nitrogen that is float controlled for supplying to the fog generator chamber or container. In this form of the invention, a frame 80 forms a common frame for supporting a fog generator container or chamber 81, and is supported directly onto a horizontal member 82 of the frame. A boiler 83, is supported on an upright member of the frame. A liquid nitrogen supply and Dewar tank 84 has a portion that overlies the upper part of the fog generator container.

The boiler 83 is a container having an interior compartment 86, in which a heater 87 is mounted. The heater 87 is used for boiling deionized water from a water source 90, that is connected through a conduit 91 and a water-fill valve 92 to the interior chamber 86. The boiler has a vent valve 94 at the upper portions thereof for safety purposes, and also has a water drain valve 95 that will permit draining water from the boiler. The drain valve 95 leads to a drain conduit 96 that discharges in the desired location.

When the heater 87 is on and water is being supplied, in a sequence that will be explained in connection with the electrical schematic, steam is provided through a steam outlet line 97 at the upper portions of the boiler, which passes into a manually controlled valve 100 that has a manual handle 101 that can be adjusted for controlling the amount of steam that is being provided through a steam outlet tube 103. The tube 103 extends, as can be seen, through the boiler chamber on the outlet side of the valve 100, so that the steam provided to the interior chamber 107 of fog generator container 81 is at a high temperature. The steam supply pipe 103 extends through a cover 105 of the fog generator container 81 and into interior chamber 107.

As can be seen, a supply of liquid nitrogen indicated at 108 in the interior chamber 107, is at a particular selected level so that when steam is being provided through the steam injector or supply conduit 103, through the lower end 103A thereof, the surface indicated at 108A of the liquid nitrogen or other cryogen material in the container 81 depresses or deflects slightly so that the end opening 103A of the steam injector or supply conduit 103 is spaced from the surface of the cryogen, and steam then passes out over this surface. The surface 108A is extremely cold and the steam condenses into fine water droplets as previously explained, generating a fog which then exits out through a provided opening in a fog supply tube 112. Tube 112 passes through the cover 105 of container 81 and discharges to a desired location, for example directly into a room.

Figure 6:
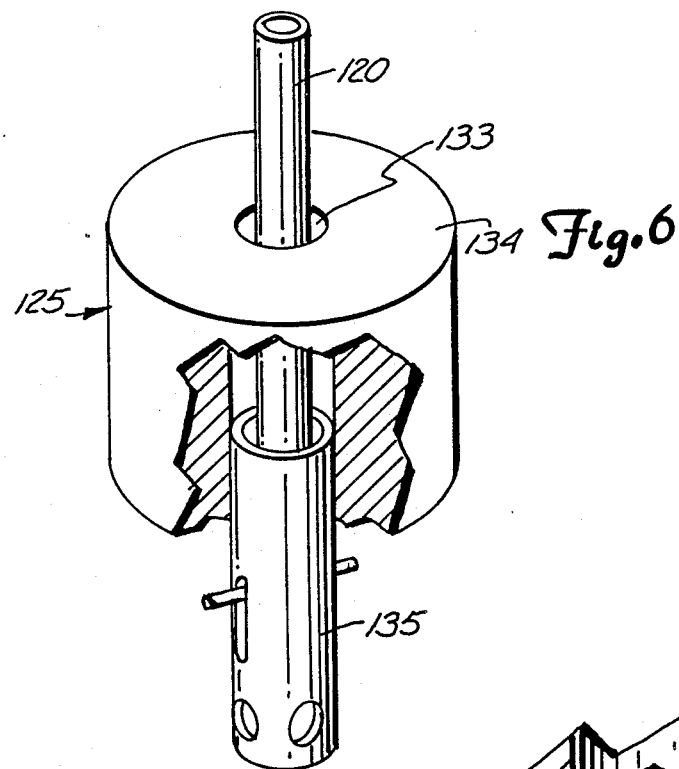
FIG. 6 is a perspective view of a liquid nitrogen control float valve used with the present invention.
Figure 7:
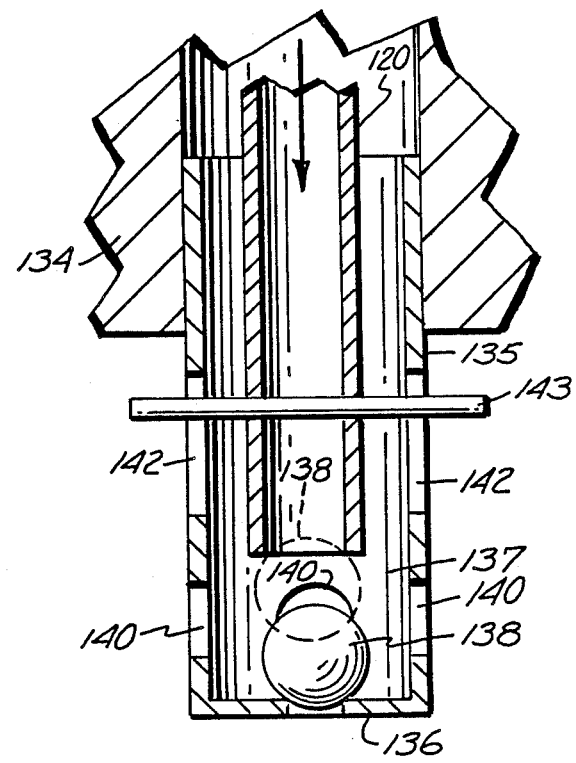
FIG. 7 is a vertical sectional view showing the interior workings of a nitrogen float control valve.

The liquid nitrogen supply Dewar reservoir or tank 84 has a sufficient volume of cryogen to provide makeup liquid nitrogen to the fog generator container 81, and as shown it is supported on the frame with its lower edge above the cover 105. The liquid nitrogen reservoir 84 has an outlet conduit 116 in which a shut-off valve 117 is provided. The valve 117 has a liquid nitrogen control supply conduit 120 on its outlet side. The central supply conduit extends through the cover 105, and through a suitable adjusting collar 121 into the chamber 107 of the fog generator container 81. The central supply conduit 120 has a float control valve assembly 125 at the outlet end thereof, as shown in FIGS. 6 and 7. In addition, there is a tubular shield 130 around the liquid nitrogen central supply conduit 120 and the float control valve 125, that terminates above the lower end of the liquid nitrogen supply conduit so it does not interfere with the float valve operation. The shield 130 does extend below the maximum level desired for the liquid nitrogen in container 81. This shield 130 can be used for carrying a temperature sensitive element such as a thermistor indicated at 131 that will provide a signal for a shutoff if the liquid nitrogen exceeds a desired level, which would be greater than the normal float level.

In FIGS. 6 and 7, the float valve that is used is shown. The liquid nitrogen supply conduit 120 as shown passes through an opening 133 formed in a polyvinylchloride or other suitable material float 134. Float 134 can be made of foam material of a desired density. The opening 133 is larger than the diameter of the central supply conduit 120, so that the float will slide easily along the longitudinal axis of the conduit. At the lower portion of the float 134, a valve guide sleeve 135 is mounted. The sleeve can be press fitted into the opening 133, or suitably cemented to the surfaces defining the opening with adhesives.

The valve sleeve or body 135, as shown in FIG. 7, has a lower end wall 136. It also has an interior chamber 137 and ball check valve 138 is mounted on the interior of chamber 137. Side walls of the valve sleeve 135 also has lateral openings indicated at 140, to permit liquid nitrogen to escape or flow out into the chamber 107 of container 81 when the float 134 is in the position shown in FIG. 7.

In addition to the openings 140, the valve sleeve 135 has a pair of diametrically opposed slots 142, which are of size to receive and permit sliding along a pin 143 that is press fitted into the lower portion of the liquid nitrogen central supply conduit 120 through provided openings. This pin 143 then is fixed in position and extends laterally from the central supply conduit 120. The ends of the pins 143 will slide in the slots 142 to permit the float 134 and the valve sleeve 135 to move relative to the central supply conduit 120.

The check valve ball 138 will seat against the lower edge of the central supply conduit 120 as shown in dotted lines in FIG. 7, and when the liquid nitrogen urges the float 134 upwardly to the desired level, the ball 138 then will close off the flow of liquid nitrogen to the fog generator container. As the level in the chamber 107 drops, the valve sleeve 135 will lower along with the float, causing the valve ball 138 to clear the end of the central supply conduit 120 and permit liquid nitrogen to flow through the conduit 120 and into the chamber 107.

Thus, an adequate supply of liquid nitrogen is provided for operations at extended periods of time.

Figure 8:
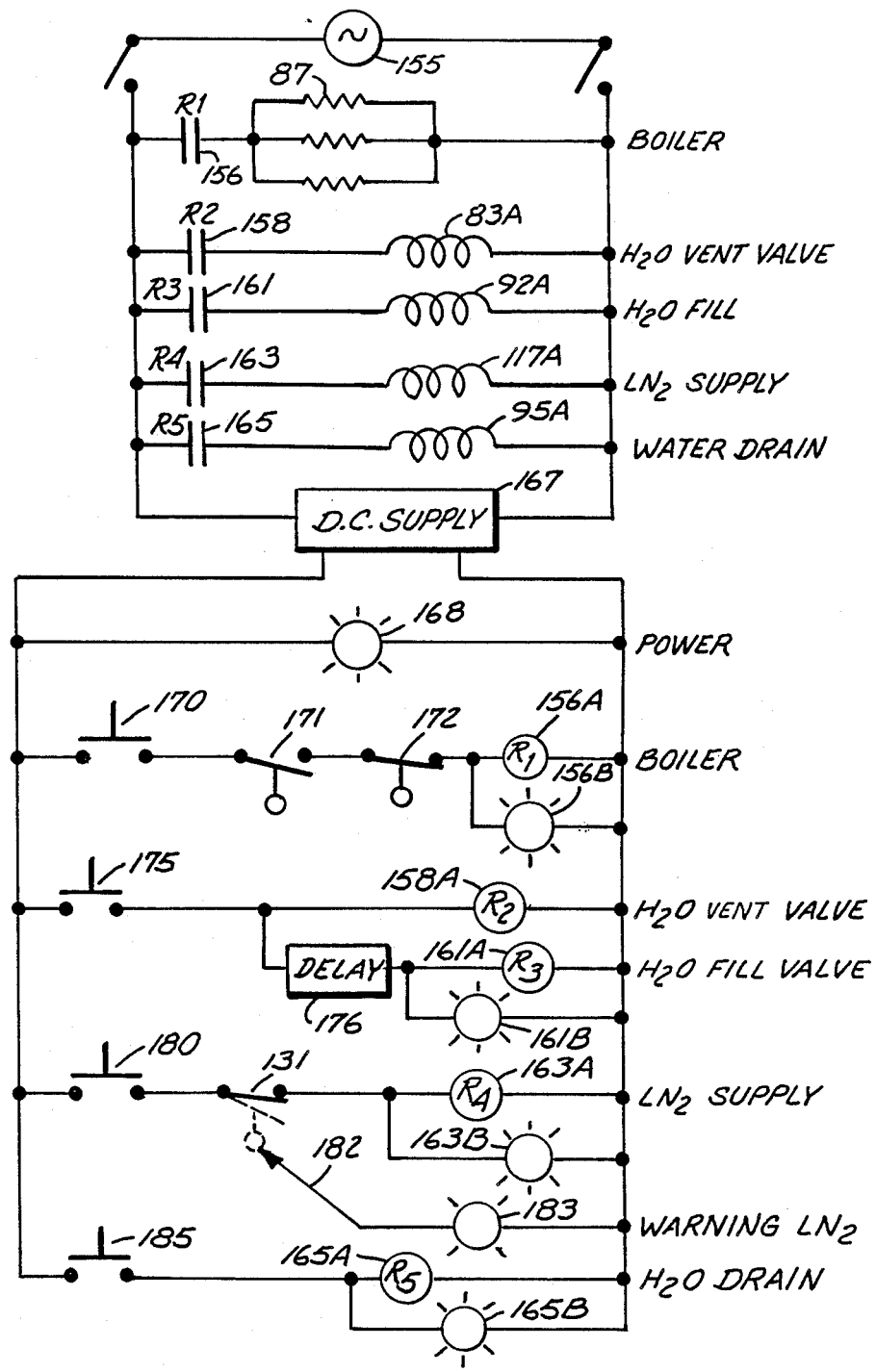
FIG. 8 is a schematic representation of an electrical diagram used with the second form of the invention.

Referring to FIG. 8, a schematic representation of a typical control circuit used with the present invention is illustrated.

At the upper part of the drawing, an AC section is shown including a power source 155, that operates through normally open relay contacts 156 to energize the steam boiler heater 87, which, as shown has three resistance elements in parallel. Additionally, normally open contacts 158 are provided for operating a solenoid coil 83A for the water vent valve 83 in the boiler. Normally open contacts 161 control a circuit to a solenoid coil 92A for operating and opening the water fill valve 92 of the boiler. Normally open contacts 163 are used for controlling power to a solenoid coil 117A that controls opening of the liquid cryogen (nitrogen) supply valve 117 to provide the "on" function for maintaining the liquid cryogen level in container 81; and normally open contacts 165 are used for energizing a solenoid coil 95A that controls the water drain valve 95 for the boiler.

A DC power supply 167 is also provided and has an output side that is used for energizing various relay coils and controlling switching through low voltage relays and contacts. The DC supply power indicator lamp 168 indicates that the D.C. power is on, and the heater 87 for the boiler is controlled through a push button switch 170, which is depressed for providing power to a line including a low water level float valve switch 171 in series. When the float valve closes, it means the water is sufficiently high in the boiler so that the boiler can operate. In addition, a series pressure switch 172 is closed when the pressure in the boiler is below a desired upper pressure limit.

When these series switches 170, 171 and 172 are closed, a relay coil 156A is energized to close the contacts 156 and power the heater. The closing of the series switches 170, 171 and 172 also provides power to an indicator lamp 156B indicating that the boiler heater is on.

A second circuit includes a manual power switch 175, which when closed, will energize a relay coil 158A that closes contacts 158, and energizes the vent valve coil 83A to open the vent in the boiler. At the same time the switch 175 is closed, a time delay of about three seconds, indicated by the circuit 176, is energized. and when this time delay elapses, a relay coil 161A is energized to close the contacts 161 and energize the solenoid 92A to open the water fill valve 92. Likewise, an indicator lamp 161B is also lit, indicating that the fill valve is open.

A push button switch 180 provides power to a line that includes a normally closed temperature sensor (thermistor) actuated switch 131, which is closed when the liquid nitrogen is below the maximum allowable level, and when the switch 180 and the switch 131 are both closed, a relay coil 163A is energized to provide power to the solenoid 117A and open the liquid nitrogen supply valve 117. Also, an indicator lamp 163B is lit at that time indicating that the valve for providing liquid nitrogen to the fog generator container 81 is open.

The provision of liquid nitrogen to maintain a desired level then is under the control the float valve 125, because whenever the float valve is open, nitrogen will be supplied through the control valve 117 and central supply conduit 12.

If the liquid nitrogen exceeds a particular level and contacts the temperature sensitive switch 131, the switch will be actuated to break the circuit to the relay coil 163A and open contacts 163, but at the same time, it will close a contact to a line 182 that energizes a warning light (usually a red light) 183 indicating that the liquid nitrogen in the fog generator container 81 is above a safe level.

For draining the water from the boiler, a push button switch 185 is provided which energizes a relay coil 165A, and which also energizes a lamp 165B. The contacts 165 are closed by the coil 165A to close a circuit to a solenoid coil 95A and thus open valve 95 to drain water from the boiler.

The float control for the liquid nitrogen maintains the desired level in a relatively simple way and permits a large size Dewar flask supply tank to be independently provided so that the fog generator chamber 107 in container 81 does not have to have a large volume, and the surface of the liquid nitrogen can be maintained at a desired level in relation to the steam supply conduit. The steam supply conduit does not have to be constantly adjusted as liquid nitrogen escapes from the fog generator.

If desired, the steam supply conduit 103 also can be adjustably mounted along its longitudinal axis relative to the level 108A of the liquid nitrogen 108 in the fog generator container 81.

Suitable nozzles, of course, can be connected to the exit conduit 112, by discharging the fog at a desired pattern into the room or other location. The apparatus operates without contaminating the environment and thus it can be placed directly in a clean room.

The apparatus shown is non-contaminating; that is, it forms a fog free from contaminating particles, and it has been determined that no particles larger than 0.15 microns have been passed through the system using deionized water in the boiler. The only sources of the particles would be the liquid nitrogen and water and both are unlikely to contain large partices. The boiler water is usually deionized and highly purified. The procedure used to produce the fog is such that any contaminant particles in the liquid nitrogen and in the deionized water used in the steam boiler should remain in the liquid droplets rather than become aerosols.

Although the present invention has been described with reference to preferred embodiments, workers skilled in the art will recognize that changes may be made in form and detail without departing from the spirit and scope of the invention.

What is claimed is:

1. A non-contaminating flow visualization fog generator system for indicating airflow in a room comprising:
   means for providing a flow of steam;
   a first container holding a liquid cryogen having an exposed surface;
   means receiving the flow of steam and discharging the flow of steam at a location in the first container so the steam passes over the cryogen surface and changes to a fog containing water droplets;

means for permitting discharge of the fog from the reservoir containing the cryogen into a room;

a separate supply of liquid cryogen supported adjacent the first container; and means for controlling flow of the liquid cryogen from the supply to the first container to maintain a desired level of cryogen in the first container.

2. The apparatus as specified in claim 1 and nozzle means connected to the means for permitting discharge from the for discharging a fog formed.

3. The apparatus as specified in claim 1 and means for controlling flow of steam to the container containing the cryogen comprises an adjustable flow control valve.

4. The apparatus as specified in claim 1 wherein said means for providing steam comprises a boiler, and control means associated with said boiler for regulating the pressure within said boiler.

5. The apparatus as specified in claim 1, wherein said means to control flow of the liquid cryogen from the separate supply to the container comprises a float valve in the container, the float valve including a central supply conduit connected to the supply of the liquid cryogen and having an end opening at the lower end thereof, a float surrounding said central conduit, a valve sleeve supported on the float and guided by the central conduit, a ball check valve supported in said valve sleeve below the lower end opening of the central conduit, said valve sleeve having at least one discharge opening therethrough, the ball check valve being aligned with the central conduit such that as the float moves the valve sleeve toward the lower end of the conduit as controlled by the level of the liquid cryogen, the ball engaging and closing the end opening of the conduit when the liquid nitrogen reaches a desired level.

6. A non-contaminating flow visualization fog generator system comprising:

a frame;

means on the frame for providing a flow of steam at a desired volume;

a source of a liquid cryogen on said frame;

conduit means for coupling the flow of steam to the source of liquid cryogen so the steam interfaces with the liquid cryogen whereby the steam changes to a visible fog; and means for permitting discharge of the visible fog in a desired location.

7. The apparatus of claim 6 wherein said source of liquid cryogen comprises a container containing the liquid cryogen, said liquid cryogen having an exposed surface over which the steam is passed to provide the interface with the liquid cryogen.

8. The apparatus as specified in claim 6 and means for controlling flow of steam comprising a flow control valve.

9. The apparatus as specified in claim 7 wherein said means for providing a flow of steam comprises a boiler, and control means associated with said boiler for regulating the pressure within said boiler.

10. The apparatus of claim 7 and a supply tank of liquid cryogen of substantially larger volume than the volume of the container, and means to control flow from the supply tank to the container.

11. The apparatus as specified in claim 6, wherein said means to control flow of the liquid cryogen from the supply tank to the container comprises a float valve in the container, the frame supporting the supply tank above the container, a central supply conduit connected to the supply tank of the liquid cryogen extending into the container and having a lower end opening in the container, a valve float, said float carrying a valve sleeve that surrounds a portion of the central supply conduit, a ball valve mounted in said valve sleeve, said valve sleeve having openings therethrough for discharge of liquid cryogen and being aligned with the central supply conduit such that as the float moves the valve sleeve toward the lower end of the conduit, the ball engages and closes the end opening of the conduit when the liquid nitrogen reaches a desired level.

12. The apparatus of claim 6, and wherein said means for providing a flow of steam comprises steam generator means mounted on said frame above said container, and a supply of high purity water for supplying to the steam boiler to minimize contaminants in the fog formed.

13. The apparatus as specified in claim 6 and means for determining the temperature of the fog and means for regulating the temperature of the fog so the fog is substantially neutrally bouyant.

14. The apparatus as specified in claim 11, wherein the means for coupling the flow of steam to the source of liquid cryogen comprises a discharge tube that has an outlet opening that provides a flow of steam over a surface of the cryogen, and the means for regulating comprises adjustable means for adjusting the end of the discharge tube relative to the surface of the cryogen to control the characteristics of the fog formed.

15. The apparatus of claim 10 wherein said central supply conduit is substantially vertical and the float surrounds the central supply conduit.

16. The apparatus of claim 13 and means for guiding said valve sleeve for limited sliding movement in direction along said control conduit.

17. The apparatus of claim 14 wherein said valve sleeve has a closed end wall below the end opening of said central conduit, said ball being supported by said closed end wall.

18. The apparatus of claim 16 wherein said means for guiding said valve sleeve comprises a pin fixed to the central supply conduit and slots in said valve sleeve slidably mounted on said valve sleeve.

19. The apparatus of claim 10 and a tubular shield surrounding the central supply conduit and at least portions of the float.

* * * * *

UNITED STATES PATENT AND TRADEMARK OFFICE
CERTIFICATE OF CORRECTION

PATENT NO. : 4,875,340

DATED : October 24, 1989

INVENTOR(S) : Benjamin Y. H. Liu et al.

It is certified that error appears in the above-identified patent and that said Letters Patent is hereby corrected as shown below:

Column 9, add a period after line 11, and cancel line 12 so the claim reads as follows:

--2. The apparatus as specified in claim 1 and nozzle means connected to the means for permitting discharge.--

Signed and Sealed this

Fifteenth Day of January, 1991

Attest:

HARRY F. MANBECK, JR.

*Attesting Officer*   *Commissioner of Patents and Trademarks*